(12) United States Patent
Han et al.

(10) Patent No.: US 12,381,204 B2
(45) Date of Patent: Aug. 5, 2025

(54) NEGATIVE ELECTRODE FOR LITHIUM SECONDARY BATTERY AND LITHIUM SECONDARY BATTERY INCLUDING THE SAME

(71) Applicant: SK On Co., Ltd., Seoul (KR)

(72) Inventors: Jun Hee Han, Daejeon (KR); Hyo Mi Kim, Daejeon (KR); Moon Sung Kim, Daejeon (KR); Sang Baek Ryu, Daejeon (KR); Seung Hyun Yook, Daejeon (KR); Hwan Ho Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 182 days.

(21) Appl. No.: 17/347,742

(22) Filed: Jun. 15, 2021

(65) Prior Publication Data

US 2021/0391570 A1     Dec. 16, 2021

(30) Foreign Application Priority Data

Jun. 16, 2020 (KR) .................. 10-2020-0073050

(51) Int. Cl.
| | |
|---|---|
| H01M 4/36 | (2006.01) |
| H01M 4/02 | (2006.01) |
| H01M 4/133 | (2010.01) |
| H01M 4/48 | (2010.01) |
| H01M 4/587 | (2010.01) |
| H01M 10/0525 | (2010.01) |

(52) U.S. Cl.
CPC .......... *H01M 4/366* (2013.01); *H01M 4/133* (2013.01); *H01M 4/364* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
CPC .......... H01M 4/133–134; H01M 4/362–366; H01M 4/386; H01M 4/583; H01M 4/587; H01M 4/1393; H01M 10/0525; H01M 200/021; H01M 2004/027; H01M 4/134; H01M 4/364; H01M 4/366; H01M 4/625; H01M 4/624; H01M 4/483; H01M 4/0404; H01M 10/0567; Y02E 60/10; Y02P 7/50; Y02T 10/70; C01B 32/20
See application file for complete search history.

(56) References Cited

U.S. PATENT DOCUMENTS

| | | | |
|---|---|---|---|
| 2014/0186702 A1* | 7/2014 | Takahata | H01M 4/364 |
| | | | 429/211 |
| 2018/0062158 A1* | 3/2018 | Kim | H01M 4/364 |
| 2019/0305308 A1* | 10/2019 | Lee | H01M 4/133 |
| 2020/0176753 A1* | 6/2020 | Lee | H01M 4/133 |
| 2021/0083273 A1 | 3/2021 | Song et al. | |
| 2021/0119200 A1 | 4/2021 | Nam | |

FOREIGN PATENT DOCUMENTS

| | | | | |
|---|---|---|---|---|
| EP | 3855531 A1 * | 7/2021 | .......... | C07D 319/06 |
| KR | 20160087121 A * | 7/2016 | .......... | H01M 4/36 |
| KR | 1020180035693 A | 4/2018 | | |
| KR | 1020190019854 A | 2/2019 | | |
| KR | 1020190033214 A | 3/2019 | | |
| KR | 1020190042299 A | 4/2019 | | |
| KR | 1020190064480 A | 6/2019 | | |
| KR | 1020200055448 A | 5/2020 | | |

OTHER PUBLICATIONS

Jeschull et al., "Electrochemistry and morphology of graphite negative electrodes containing silicon as capacity-enhancing electrode additive," Electrochimica Acta, vol. 320, 2019. (Year: 2019).*
EP-3855531-A1 Machine Translation.*
KR-20160087121-A Machine Translation.*

* cited by examiner

*Primary Examiner* — Jeffrey T Barton
*Assistant Examiner* — Bethany C Garcia
(74) *Attorney, Agent, or Firm* — The Webb Law Firm

(57) ABSTRACT

Provided are a negative electrode for a lithium secondary battery and a lithium secondary battery including the same, the negative electrode for a lithium secondary battery including a current collector; a first negative electrode active material layer disposed on the current collector and including a first graphite-based active material containing artificial graphite and natural graphite, and a first silicon-based active material; and a second negative electrode active material layer disposed on the first negative electrode active material layer and including a second graphite-based active material containing artificial graphite and natural graphite, and a second silicon-based active material. The first graphite-based active material has a content of the artificial graphite equal to or less than that of the natural graphite, and the second graphite-based active material has a content of the artificial graphite greater than that of the natural graphite.

9 Claims, No Drawings

NEGATIVE ELECTRODE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2020-0073050 filed Jun. 16, 2020, the disclosure of which is hereby incorporated by reference in its entirety.

BACKGROUND OF THE INVENTION

Field of the Invention

The following disclosure relates to a negative electrode for a lithium secondary battery and a lithium secondary battery including the same

Description of Related Art

Recently, a demand for eco-friendly technologies as a countermeasure against global warming along with a global warming issue has rapidly increased. In particular, in accordance with an increase in a technical demand for an electric vehicle and an energy storage system (ESS), a demand for a lithium secondary battery that has been prominent as an energy storage device has also explosively increased. Thus, studies on improving an energy density of the lithium secondary battery have been conducted.

However, an existing commercialized lithium secondary battery generally uses a graphite active material such as natural graphite and artificial graphite, but an energy density of the existing commercialized lithium secondary battery is low due to a low theoretical capacity of graphite (372 mAh/g). Therefore, studies on improving the energy density by developing a new negative electrode material have been conducted.

As a solution to the improvement of the energy density, an Si-based material having a high theoretical capacity (3580 mAh/g) has emerged. However, such an Si-based material has a disadvantage that lifespan characteristics of the battery are deteriorated due to a large volume expansion (~400%) in a repeated charging and discharging process. Accordingly, an $SiO_x$ material having a lower volume expansion rate than Si has been developed in order to solve an issue of the large volume expansion of the Si material, However, the $SiO_x$ material has problems such as an increase in interface resistance and deterioration in the lifespan characteristics due to side reactions between the Si-based material and an electrolyte, and reduction in electrode adhesive force due to volume expansion occurs, such that there is a limitation in applying the $SiO_x$ material.

SUMMARY OF THE INVENTION

An embodiment of the present invention is directed to providing a high-capacity negative electrode in which negative electrode detachment is suppressed and quick lifespan characteristics are improved through improvement of an adhesive force to a negative electrode current collector and reduction of interfacial resistance by making blending ratios between natural graphite and artificial graphite in a negative electrode active material layer including a silicon-based material different from each other.

In one general aspect, a negative electrode for a lithium secondary battery includes: a current collector; a first negative electrode active material layer disposed on the current collector and including a first graphite-based active material containing artificial graphite and natural graphite, and a first silicon-based active material; and a second negative electrode active material layer disposed on the first negative electrode active material layer and including a second graphite-based active material containing artificial graphite and natural graphite, and a second silicon-based active material, wherein the first graphite-based active material has a content of the artificial graphite equal to or less than that of the natural graphite, and the second graphite-based active material has a content of the artificial graphite greater than that of the natural graphite.

The first graphite-based active material may contain the artificial graphite and the natural graphite in a weight ratio of 5:95 to 50:50.

The second graphite-based active material may contain the artificial graphite and the natural graphite in a weight ratio of 97.5:2.5 to 55:45.

The first negative electrode active material layer may include 0.1 to 35% by weight of the first silicon-based active material, based on the total weight of the active material, and the second negative electrode active material layer may include 0.1 to 35% by weight of the second silicon-based active material, based on the total weight of the active material.

The first negative electrode active material layer may include 6 to 30% by weight of the first silicon-based active material, based on the total weight of the active material, and the second negative electrode active material layer may include 6 to 30% by weight of the second silicon-based active material, based on the total weight of the active material.

The negative electrode for a lithium secondary may further include a third negative electrode active material layer disposed on the second negative electrode active material layer and including a third graphite-based active material containing artificial graphite.

The third graphite-based active material may be granular-type or bimodal-type artificial graphite and may have a particle size of 13 to 20 μm.

The third negative electrode active material layer may have a density of 1.55 to 1.8 g/cm$^3$.

A thickness ratio between the first negative electrode active material layer and the second negative electrode active material layer may be greater than 3:7 and less than 7:3.

A thickness of the third negative electrode active material layer may be 0.5 to 15% based on the total thickness of the negative electrode active material layers.

The first negative electrode active material layer and the second negative electrode active material layer may have a continuous concentration gradient of the active material at an interface therebetween.

In another general aspect, there is provided a lithium secondary battery including the negative electrode as described above; a positive electrode; a separator; and an electrolyte.

DESCRIPTION OF THE INVENTION

Various advantages and features of the present invention and methods accomplishing them will become apparent from the following description of exemplary embodiments with reference to the accompanying drawings. However, the present invention is not limited to exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims. Specific details for the practice of the present invention will be described in detail with reference to the accompanying drawings below. Regardless of the drawings, the same reference numerals refer to the same elements, and "and/or" includes each and all combinations of one or more of the mentioned items.

Unless otherwise defined, all terms (including technical and scientific terms) used herein have the general meaning understood by those skilled in the art to which the present invention pertains. Throughout the present specification, unless described to the contrary, "comprising" any component will be understood to imply the further inclusion of other elements rather than the exclusion of other elements. In addition, unless explicitly described to the contrary, a singular form includes a plural form in the present specification.

It will be understood that when an element such as a layer, a membrane, a region, a plate or the like, is referred to as being "on" or "over" another element, it may be "directly on" another element or may have an intervening element present therebetween.

In an exemplary embodiment of the present invention, there is provided a negative electrode for a lithium secondary battery. The negative electrode includes a current collector; a first negative electrode active material layer disposed on the current collector and including a first graphite-based active material containing artificial graphite and natural graphite, and a first silicon-based active material; and a second negative electrode active material layer disposed on the first negative electrode active material layer and including a second graphite-based active material containing artificial graphite and natural graphite, and a second silicon-based active material, wherein the first graphite-based active material has a content of the artificial graphite equal to or less than that of the natural graphite, and the second graphite-based active material has a content of the artificial graphite greater than that of the natural graphite.

Example of the current collector may be, but is not limited to, one selected from the group consisting of copper foil, nickel foil, stainless steel foil, titanium foil, nickel foam, copper foam, a polymer substrate coated with a conductive metal, and a combination thereof.

The first negative electrode active material layer is disposed on the current collector and includes a first graphite-based active material containing artificial graphite and natural graphite, and a first silicon-based active material.

The first graphite-based active material is characterized in that the content of the artificial graphite is the same as or less than the content of the natural graphite. The first negative electrode active material layer may improve adhesive force between the silicon-based material and the negative electrode current collector by increasing the ratio of the natural graphite-based material and relatively reducing the ratio of the artificial graphite-based material in the first graphite-based material. Specifically, during the intercalation/deintercalation of Li ions, as the stress due to volume expansion of the silicon-based active material is relieved to suppress the expansion of the negative electrode active material and increase the adhesive force of the negative electrode active material, electrode detachment may be suppressed, and interface resistance and the adhesive force between the current collector and the negative electrode active material layer may thus be further improved.

The negative electrode may include the artificial graphite and the natural graphite in a weight ratio of 6:4 to 8:2 and preferably in a weight ratio of 6.5:3.5 to 7.5:2.5, based on the total weight of the first graphite-based active material and the second graphite-based active material.

Conventionally, it was attempted to improve capacity characteristics by using a silicon-based active material as a negative electrode material, but volume expansion of the active material and irreversible side reactions of the electrolyte occurred, so that the silicon-based active material was mixed with a large amount of graphite-based active material. As a graphite-based active material, natural graphite is inferior due to an increase in resistance caused by high-rate charging and discharging, and artificial graphite did not inhibit the expansion characteristics of the silicon-based active material, and thus showed inferiority in terms of lifespan characteristics. In the present invention, in order to solve the above-described problem, the total weight ratio of the artificial and natural graphite may be used in a specific range to improve high-rate charge/discharge characteristics, and different graphite blending is applied to the first negative electrode active material layer and the second negative electrode active material layer to improve a high-rate charging capacity caused by reduction in resistance. Accordingly, excellent charging, output characteristics, lifespan characteristics, and fast lifespan characteristics may be secured.

The first graphite-based active material may contain the artificial graphite and the natural graphite in a weight ratio of 5:95 to 50:50, preferably in a weight ratio of 10:90 to 45:55, and more preferably in a weight ratio of 25:75 to 40:60. When the graphite-based active material consists of the stated content ratios, the first negative electrode active material layer may further improve adhesive force between the silicon-based material and the negative electrode current collector. Meanwhile, when a weight ratio between the artificial graphite and the natural graphite is less than 5:95, the content of artificial graphite in the first negative electrode active material layer in contact with the current collector is excessively reduced, such that output characteristics and lifespan maintenance rate are not good. On the contrary, when the weight ratio of the artificial graphite and the natural graphite exceeds 50:50, the ratio of natural graphite is insufficient, such that the adhesive force to the negative electrode current collector caused by volume expansion of the silicon-based active material is insufficient.

In addition, the first graphite-based active material may be a combination of the natural graphite and the artificial graphite, may have a particle size of 8 to 20 μm, and may have, but is not limited to, an amorphous shape, a plate shape, a flake shape, a spherical shape or a fiber shape.

The first silicon-based active material may be a silicon-based material, for example, Si, $SiO_x$ ($0<x<2$), a Si-Q alloy (where the Q is an element selected from the group consisting of an alkali metal, an alkaline earth metal, a group 13 element, a group 14 element, a group 15 element, a group 16 element, a transition metal, a rare earth element, and a combination thereof, and is not Si), a Si-carbon composite, or a mixture of at least one of them and $SiO_2$. The first silicon-based active material may preferably be Si or $SiO_x$ ($0<x<2$), and more preferably $SiO_x$ ($0<x<2$).

The first silicon-based active material particles may have an average particle size of less than 30 μm and greater than 2 μm, preferably less than 20 μm and greater than 5 μm, and more preferably less than 10 μm and greater than 7 μm, and during intercalation/deintercalation of Li ions within the above range, the volume expansion of the negative electrode active material particles is reduced, such that electrode deterioration may be suppressed.

In addition, the first silicon-based active material may be included in an amount of 0.1 to 35% by weight, 1 to 30% by weight, or 3 to 30% by weight, based on the total weight of the active material included in the first negative electrode active material layer. The first silicon-based active material may be more specifically included in an amount of 6 to 30% by weight, preferably 6 to 20% by weight, and more preferably 9 to 20% by weight, based on the total weight of the active material included in the second negative electrode active material layer. The above-mentioned content range of the silicon-based active material may prevent a rapid increase in the ratio of the increase in a volume expansion rate relative to the increase in an energy density of the cell, and thus, a fast charging lifespan may be maintained at a very high level.

In the negative electrode according to an exemplary embodiment of the present invention, the second negative electrode active material layer is disposed on the first negative electrode active material layer, and includes a second graphite-based active material containing artificial graphite and natural graphite, and a second silicon-based active material.

The second graphite-based active material is characterized in that the content of the artificial graphite is higher than that of the natural graphite. That is, the fast charging characteristics and lifespan retention rate of the second negative electrode active material layer including the silicon-based material may be improved by increasing the ratio of the artificial graphite-based material and minimizing the ratio of the natural graphite-based material in the second graphite-based active material.

The second graphite-based active material may contain the artificial graphite and the natural graphite in a weight ratio of 97.5:2.5 to 55:45, preferably in a weight ratio of 95:5 to 55:45, and more preferably in a weight ratio of 90:10 to 60:40. When the graphite-based active material consists of the stated content ratios, the second negative electrode active material layer may further improve high-rate charging characteristics. On the other hand, when the weight ratio of the artificial graphite and the natural graphite is less than 55:45, the content of artificial graphite in the second negative electrode active material layer is reduced, such that the fast charging characteristics and lifespan retention rate are not sufficiently implemented. On the contrary, when the weight ratio of the artificial graphite and the natural graphite exceeds 97.5:2.5, the ratio of natural graphite is insufficient, such that an interfacial adhesive force between the first negative electrode active material layer and the second negative electrode active material layer is reduced, and thus, the negative electrode interface resistance caused by volume expansion of the second silicon-based active material may be rapidly increased.

The second graphite-based active material may have the same physical properties as those described as the shape and the average particle diameter of the first graphite-based active material, and an active material that is the same as or different from the first graphite-based active material may be used as the second graphite-based active material.

The second silicon-based active material may be the same material as those described as the type of the first silicon-based active material, and an active material that is the same or different for the first silicon-based active material may be used as the second silicon-based active material.

In addition, the second silicon-based active material may be included in an amount of 0.1 to 35% by weight, 1 to 30% by weight, or 3 to 30% by weight, based on the total weight of the active material included in the second negative electrode active material layer. The second silicon-based active material may be more specifically included in an amount of 6 to 30% by weight, preferably 6 to 20% by weight, and more preferably 9 to 20% by weight, based on the total weight of the active material included in the second negative electrode active material layer. The above-described content range of the silicon-based active material may prevent a rapid increase in the ratio of the increase in the volume expansion rate relative to the increase in the energy density of the cell, and thus, a fast charging lifespan may be maintained at a very high level.

The negative electrode for a lithium secondary battery according to an exemplary embodiment of the present invention may further include a third negative electrode active material layer disposed on the second negative electrode active material layer and including a third graphite-based active material containing artificial graphite. Meanwhile, an upper layer (the third negative electrode active material layer) of the electrode is a region in contact with an excessive amount of the electrolyte, such that side reactions of the electrolyte are likely to occur. When the electrolyte comes into direct contact with the silicon-based active material, the electrode is significantly contracted/expanded during intercalation/deintercalation of Li ions, resulting in a new interface, which may easily lead to irreversible depletion of the electrolyte due to side reactions. As a result, a cell deterioration mode in which the lifespan retention rate is rapidly reduced is caused.

In the present invention, the active material of the third negative electrode active material layer consists of only graphite-based active materials, and the expansion/contraction of the active material is smaller than that of the silicon-based active material, such that an isolation phenomenon of the active material due to charging and discharging may be improved. Thus, when the battery is repeatedly charged and discharged, excessive contact between the electrolyte and the silicon-based active material is prevented to minimize side reactions, and expansion of the electrode in the thickness direction of the silicon-based active material is suppressed, such that excessive increase in resistance in fast lifespan evaluation may also be prevented.

The third graphite-based active material may be a surface-coated granular-type or bimodal-type artificial graphite and may have a particle size of 13 to 20 μm, and preferably may be surface-coated granular artificial graphite and may have a particle size of 16 to 20 μm.

The third graphite-based active material, which is the surface-coated granular-type or bimodal-type artificial graphite, is an active material having excellent output, fast charging, and lifespan maintenance rate, and may thus improve output (e.g., 10 s resistance and output) and fast charging (having improved Li intercalation in the upper layer of the electrode) indicating cell characteristics for a short period of time by the third negative electrode active material.

The surface coating of the third graphite-based active material may be specifically included on at least a part of the surface of graphite particles. The carbon coating layer is formed of hard carbon, soft carbon, heavy oil, or pitch, and may be an amorphous carbon coating layer. As a non-limiting example, the hard carbon may be heat-treated at a temperature of 700 to 1200° C. for 3 to 6 hours to generate a coating layer, and the soft carbon may be heat treated at a temperature of 1000 to 1300° C. for 3 to 6 hours to generate a coating layer, but the present invention is not limited thereto.

Meanwhile, the particle size may refer to D50, and the D50 refers to a particle diameter when a cumulative volume becomes 50% from a small particle diameter in a particle size distribution measurement by a laser scattering method. Here, the D50 may be obtained by measuring the particle size distribution using a Mastersizer3000 (Malvern) by taking samples according to a KS A ISO 13320-1 standard for the prepared carbonaceous material. Specifically, ethanol may be used as a solvent and, if necessary, dispersion may be performed using an ultrasonic disperser, and then, a volume density may be measured.

In the negative electrode according to the exemplary embodiment of the present invention, the third negative electrode active material layer may have a density of 1.55 to 1.8 g/cm$^3$, preferably 1.6 to 1.8 g/cm$^3$, and more preferably 1.65 to 1.8 g/cm$^3$.

The first negative electrode active material layer, the second negative electrode active material layer, and the third negative electrode active material layer may include a binder, and may optionally further include a conductive material.

The binder serves to adhere negative electrode active material particles well to each other and also serves to adhere the negative electrode active material well to the current collector. Examples of the water-based binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene-butadiene rubber (SBR), fluorine rubber, various copolymers thereof, etc. Specifically, the binder may be a binder consisting of carboxyl methyl cellulose (CMC), styrene-butadiene rubber (SBR), and a mixture thereof.

The conductive material is used to impart conductivity to the electrode, and may be used as long as it does not cause chemical changes in the battery to be constructed and is an electronically conductive material. Examples of the conductive material include carbon-based materials such as graphite, carbon black, acetylene black, ketjen black, and carbon fiber; metal-based materials such as metal powders, for example, copper, nickel, aluminum, and silver, or metal fibers; conductive polymers such as polyphenylene derivatives; or a mixture thereof.

Meanwhile, the binder and the conductive material may each independently be included in an amount of 1 to 10% by weight, preferably 1 to 5% by weight, and more preferably 1 to 3% by weight, based on the total weight of each of the first negative electrode active material layer, the second negative electrode active material layer, and the third negative electrode active material layer, but the present invention is limited thereto.

In the negative electrode according to an exemplary embodiment of the present invention, a thickness ratio between the first negative electrode active material layer and the second negative electrode active material layer may be greater than 3:7 and less than 7:3, preferably 4:6 to 6:4, and more preferably 4.5:5.5 to 5.5:4.5.

If the thickness ratio between the first negative electrode active material layer and the second negative electrode active material layer is greater than 3:7, the adhesive force between the current collector (Cu substrate surface) and the first negative electrode active material layer is sufficient, such that occurrence of electrode detachment due to volume expansion of the first silicon-based active material in the first negative electrode active material layer may be suppressed, and the reduction in cell capacity and a sharp drop in lifespan caused by an increase in resistance may be improved. In addition, electrode output characteristics and lifespan may be improved by suppressing reduction in porosity of the first negative electrode active material layer during electrode rolling. For example, as a thickness of the second negative electrode active material layer including a large amount of artificial graphite having hard particle strength increases, a larger load is applied to the first negative electrode active material layer including a large amount of natural graphite having relatively weak particle strength during electrode rolling, and thus, a problem such as reduction in porosity may occur due to a change in appearance caused by particle pressing.

If the thickness ratio between the first negative electrode active material layer and the second negative electrode active material layer is less than 7:3, the ratio of natural graphite having a high expansion rate is reduced during charging/discharging of the electrode, such that no problems such that problems such as an increase in resistance and reduction in life retention rate due to an increase in electrode thickness occur. In addition, as the thickness of the second negative electrode active material layer increases, the content of artificial graphite having excellent output, high-rate charging, and life characteristics is increased, such that the fast charging lifespan retention rate may be improved.

The thickness of the third negative electrode active material layer of the negative electrode may be 0.5 to 15% based on the total thickness of the first, second, and third negative electrode active material layers. If the thickness of the third negative electrode active material layer is 0.5% or more relative to the total thickness, deformation of the electrode due to volume expansion of the second silicon-based active material in the second negative electrode active material layer during charging/discharging may be suppressed. Accordingly, the probability of occurrence of the isolation phenomenon of the third negative electrode active material due to charging/discharging is reduced, thereby preventing side reactions between the second silicon-based active material and the electrolyte. If the thickness of the third negative electrode active material layer is 15% or less relative to the total thickness, it is preferable because that the total content of the first and second silicon-based active materials, which contribute greatly to cell capacity expression, is relatively increased due to the low content of the third graphite active materials, resulting in sufficient capacity implementation of a high-capacity negative electrode through the silicon-based active material.

Meanwhile, the first negative electrode active material layer and the second negative electrode active material layer have a continuous concentration gradient of the active material at an interface therebetween. Specifically, the continuous concentration gradient of the active material means that the first and second silicon-based active materials and the first and second graphite-based active materials have a continuous concentration gradient at the interface therebetween In addition, the second silicon-based active material, and the second and third graphite-based active materials may have a continuous concentration gradient even at an interface between the second negative electrode active material layer and the third negative electrode active material layer.

The concentration gradient at an interface between the first and second negative electrode active material layers or at an interface between the second and third negative electrode active material layers, may form a continuous concentration gradient of the active material by simultaneously coating first and second negative electrode slurries, or second and third negative electrode slurries during manufacture of the negative electrode, and such a coating method may use a conventionally known method.

In another exemplary embodiment, there is provided a lithium secondary battery including the negative electrode; a positive electrode; a separator; and an electrolyte.

The negative electrode is the same as described above.

The positive electrode includes a current collector and a positive electrode active material layer formed by applying a positive electrode slurry including a positive electrode active material on the current collector.

As the current collector, the above-described negative electrode current collector may be used, and any material known in the art may be used, but the present invention is not limited thereto.

The positive electrode active material layer may include a positive electrode active material, and may optionally further include a binder and a conductive material. The positive electrode active material may be any positive electrode active material known in the art. As an example of the positive electrode material, a composite oxide of lithium and a metal selected from the group consisting of cobalt, manganese, nickel, and a combination thereof is preferably used, but the present invention is not limited thereto.

As the binder and the conductive material, the above-described negative electrode binder and negative electrode conductive material may be used, and any material known in the art may be used, but the present invention is not limited thereto.

The separator may be selected from the group consisting of, for example, glass fiber, polyester, polyethylene, polypropylene, polytetrafluoroethylene, or a combination thereof, and may be in the form of a nonwoven fabric or a woven fabric. For example, in the lithium secondary battery, a separator of polyolefin-based polymer such as polyethylene and polypropylene may be mainly used, and a separator coated with a composition containing a ceramic component or a polymer material may be used in order to secure heat resistance or mechanical strength. Also, the separator may be optionally used in a single layer or multilayer structure, and any separator known in the art may be used, but the present invention is not limited thereto.

The electrolyte contains an organic solvent and a lithium salt.

The organic solvent serves as a medium through which ions involved in an electrochemical reaction of the battery may move, and examples of the organic solvent include carbonate-based, ester-based, ether-based, ketone-based, alcohol-based, or aprotic solvents. The organic solvents may be used alone or in combination of two or more, and a mixing ratio in the case of using a combination of two or more may be appropriately adjusted according to the desired performance of the battery. Meanwhile, any organic solvent known in the art may be used, but the present invention is not limited thereto.

The lithium salt is a material that is dissolved in an organic solvent, acts as a source of lithium ions in the battery, enables basic operation of a lithium secondary battery, and promotes the movement of lithium ions between the positive electrode and the negative electrode. Examples of the lithium salt include, but are not limited to, $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (where x and y are natural number), LiCl, LiI, $LiB(C_2O_4)_2$, or a combination thereof.

The concentration of the lithium salt may be used within the range of 0.1 M to 2.0 M. If the concentration of the lithium salt is within the above-described range, the electrolyte has an appropriate conductivity and viscosity, resulting in excellent electrolyte performance, and effective movement of lithium ions.

In addition, the electrolyte may further contain pyridine, triethylphosphate, triethanolamine, cyclic ether, ethylene diamine, n-glyme, hexaphosphate triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, etc., in order to improve charge/discharge properties, flame-retardant properties, etc., if necessary. In some cases, the electrolyte may further contain a halogen-containing solvent such as carbon tetrachloride and ethylene trifluoride in order to impart non-flammability, and may further contain fluoro-ethylene carbonate (FEC), propene sulfone (PRS), fluoro-propylene carbonate (FPC), etc., in order to improve high-temperature storage characteristics.

The lithium secondary battery according to the present invention for achieving the object as described above may be manufactured by sequentially stacking the manufactured negative electrode, the separator, and the positive electrode to form an electrode assembly, putting the manufactured electrode assembly into a cylindrical battery case or a prismatic battery case, and then injecting an electrolyte. Alternatively, the electrode assembly may be stacked and then impregnated in the electrolyte, and the resulting product may be put into the battery case and sealed to manufacture a lithium secondary battery.

The battery case used in the present invention may be a battery case generally used in the battery field, and an appearance of the battery case according to the use of the battery is not limited, and may have, for example, a cylindrical shape using a can, a prismatic shape, a pouch shape, or a coin shape.

The lithium secondary battery according to the present invention may be preferably used not only as a battery cell used as a power source of a small device, but may also be used as a unit battery in a medium or large-sized battery module including a plurality of battery cells. Preferred examples of a medium or large-sized device include, but are not limited to, electric vehicles, hybrid electric vehicles, plug-in hybrid electric vehicles, power storage systems, etc.

Hereinafter, preferred examples and comparative examples of the present invention will be described. However, the following examples are only a preferred example of the present invention, and the present invention is not limited to the following examples.

EXAMPLES

Example 1

<Manufacture of Negative Electrode>

A first negative electrode slurry was prepared by adding water to 90.4% by weight of a first graphite-based active material in which artificial graphite (D50:20 μm) and natural graphite (D50:10 μm) are mixed in a weight ratio of 5:5, 6.0% by weight of a first silicon-based active material of silicon oxide ($SiO_x$, 0<x<2, D50:5 μm), 0.1% by weight of an SWCNT conductive material, and 3.5% by weight of a CMC/SBR (binder, 1.5/2.0 by weight).

A second negative electrode slurry was prepared in the same manner as the first negative electrode slurry, except for using a second graphite-based active material with which the artificial graphite and natural graphite were mixed in a weight ratio of 9:1 instead of the first graphite-based active material.

A third negative electrode slurry was prepared by adding water to 96.4% by weight of a granular-type of surface-coated artificial graphite having an average particle diameter (D50) of 20 μm, 0.1% by weight of an SWCNT conductive material, and 3.5% by weight of a CMC/SBR (binder, 1.5/2.0 by weight)

The prepared first negative electrode slurry, the second negative electrode slurry, and the third negative electrode slurry were applied on one surface of a copper current collector (copper foil having a thickness of 8 μm) and dried to form a first negative electrode active material layer, a second negative electrode active material layer, and a third negative electrode active material layer. Here, each of these loadings was 5.5 mg/cm$^2$, 5.5 mg/cm$^2$, and 2.1 mg/cm$^2$. These were rolled (rolling density: 1.68 g/cm$^3$) to manufacture a negative electrode.

<Manufacture of Positive Electrode>

A slurry was prepared by mixing Li[Ni$_{0.88}$Co$_{0.1}$Mn$_{0.02}$]O$_2$ as a positive electrode active material, carbon black as a conductive material, and polyvinylidene fluoride (PVdF) as a binder with each other in a weight ratio of 96.5:2:1.5. The slurry was uniformly applied onto an aluminum foil having a thickness of 12 μm and dried in a vacuum to manufacture a positive electrode for a secondary battery.

<Manufacture of Half-Battery>

The manufactured negative electrode was used, a lithium metal was used as a counter electrode, a PE separator was interposed between the negative electrode and the counter electrode, and then an electrolyte was injected to assemble a coin cell (CR2032). The assembled coin cell was left at room temperature for 3 to 24 hours to manufacture a half-battery. Here, an electrolyte was prepared by mixing with 1.0 M LiPF$_6$ as a lithium salt in an organic solvent (EC:EMC=3:7 by volume), and then mixing with 3% by volume of a FEC as an electrolyte additive.

<Manufacture of Secondary Battery>

A positive electrode and a negative electrode were each notched at a predetermined size and stacked, and a separator (formed of polyethylene and having a thickness of 13 μm) was interposed between the positive electrode and the negative electrode to form an electrode cell. Then, welding was performed on each tab portion of the positive electrode and the negative electrode. The welded positive electrode/separator/negative electrode assembly was placed in a pouch, and sealing was performed on three sides except for a side in which the electrolyte was injected. Here, the portions with an electrode tab were included in the sealing portions.

The electrolyte was injected into the remaining side except for the sealing portions, and the remaining side was sealed, followed by impregnation for 12 hours or more.

The electrolyte was prepared by dissolving 1M LiPF$_6$ in a mixed solvent of EC/EMC/DEC (25/45/30 by volume), and adding 1% by weight of vinylene carbonate (VC), 0.5% by weight of 1,3-propenesultone (PRS), and 0.5% by weight of lithium bis(oxalate)borate (LiBOB) thereto.

Then, pre-charging was performed at a current corresponding to 0.25 C for 36 minutes After 1 hour, the battery was degassed, aged for 24 hours or more, and then formation-charged/discharged (charging condition: CC-CV 0.2 C 4.2V 0.05 C CUT-OFF, discharging condition: CC 0.2 C 2.5V CUTOFF).

Then, standard charging and discharging was performed (charging condition: CC-CV 0.5 C 4.2V 0.05 C CUT-OFF, discharging condition: CC 0.5 C 2.5V CUT-OFF).

Evaluation Example 1

Formation of Multilayer Negative Electrode Active Material Layer and Evaluation of Adhesive Force Characteristics According to Composition of First Graphite-Based Active Material and Second Graphite-Based Active Material (Artificial Graphite:Natural Graphite, by Weight)

Examples 2 and 3 and Comparative Examples 1 to 3

A negative electrode and a coin cell were manufactured in the same manner as those in Example 1, except that the weight ratio of the artificial graphite and the natural graphite in the first graphite-based active material (first layer) and the second graphite-based active material (second layer) was as shown in Table 1 below.

Comparative Example 4

A negative electrode and a coin cell were manufactured in the same manner as those in Example 1, except that the first negative electrode active material layer was formed on the current collector at 13.1 mg/cm$^2$ loading and a rolling density of 1.68 g/cm$^3$, and the weight ratio of artificial graphite:natural graphite in the first graphite-based active material was as shown in Table 1 below, without the formation of the second negative electrode active material layer and the third negative electrode active material layer.

(Evaluation Method)

*Evaluation of Interface Adhesive Force Between Negative Electrode Active Material Layer and Current Collector The negative electrode manufactured in Examples 1 to 3 and Comparative Examples 1 to 4 was cut into 18 mm in a width/150 mm in a length, a tape having a width of 18 mm was attached to a foil layer of the negative electrode, and then a roller with a load of 2 kg was used to ensure sufficient adhesion. The active material layer of the negative electrode was attached to one side of a tensile tester using double-sided tape. The tape attached to the foil was fastened to an opposite side of the tensile tester, the adhesive force was measured, and the measurement results are summarized in Table 1 below.

TABLE 1

| | Artificial graphite: natural graphite (by weight) | | | |
|---|---|---|---|---|
| | First layer | Second layer | First layer + Second layer | Adhesive force (N) |
| Example 1 | 5:5 | 9:1 | 7:3 | 0.52-0.66 (0.55) |
| Example 2 | 1:9 | 8:2 | 4.5:5.5 | 0.56-0.66 (0.58) |
| Example 3 | 1:9 | 9:1 | 5:5 | 0.53-0.69 (0.57) |
| Comp. Example 1 | 9:1 | 5:5 | 7:3 | 0.34-0.51 (0.49) |
| Comp. Example 2 | 8:2 | 2:8 | 5:5 | 0.44-0.55 (0.51) |
| Comp. Example 3 | 7:3 | 3:7 | 5:5 | 0.49-0.58 (0.54) |
| Comp. Example 4 | 7:3 (monolayer) | | | 0.45-0.57 (0.53) |

It could be confirmed from Table 1 that the coin cells manufactured according to Examples 1 to 3 of the present invention included a first graphite-based active material (first layer) having a high content of natural graphite, and exhibited excellent interfacial adhesive force between the negative electrode active material layer and the current collector as compared to Comparative Examples.

Evaluation Example 2

Evaluation of Charging Characteristics for Each Rate and Fast Charging Lifespan Characteristics
(Evaluation Method)
*Evaluation of Charging Characteristics for Each Rate After manufacturing a pouch-type secondary battery (cell) having a large capacity of 20 Ah or more using the negative electrodes and the same positive electrodes manufactured according to Examples and Comparative Examples, the pouch-type secondary battery (cell) was charged with a constant current of 0.2 C rate until a voltage reached 4.2V, and charging was then cut off at a current of 0.05 C rate while maintaining 4.2V in a constant voltage mode, thereby charging the pouch-type secondary battery (cell) at a constant voltage. Subsequently, the pouch-type secondary battery (cell) was discharged to 2.5V at 0.2 C, was charged with a constant current for each rate until a voltage reached 4.2V, and charging was then cut off at a current of 0.05 C rate while maintaining 4.2V in a constant voltage mode to perform evaluation of charging. The evaluation of charging characteristics for each rate was performed using individual batteries in a chamber maintained at a constant temperature (25° C.) at 0.33 C/0.5 C/1.0 C/1.5 C/1.7 C/2.0 C. The charging capacity (%) in the constant current section for each charging rate relative to an initial 0.2 C rate constant current charging capacity was measured, and the measurement results are shown in Table 2 below.
*Evaluation of Fast Charging Lifespan Characteristics After manufacturing a pouch-type secondary battery (cell) having a large capacity of 20 Ah or more using the negative electrodes and the same positive electrodes manufactured according to Examples and Comparative Examples, the fast charging evaluation was performed in a chamber in which the set constant temperature (35° C.) is maintained in the DOD72 (SOC8-80) range under the conditions of step charging at 1.25 C/1.0 C/0.75 C/0.5 C C-rate and 1/3 C C-rate discharging. After repeating 100/200/300 cycles with a rest time of 10 minutes between charging and discharging cycles, the fast charge capacity retention rate was measured, and the measurement results are shown in Table 2 below.

TABLE 2

| | Capacity (%) in constant current charging section | | | | | | |
|---|---|---|---|---|---|---|---|
| | 0.2 C | 0.33 C | 0.5 C | 1 C | 1.5 C | 1.7 C | 2.0 C |
| Example 1 | 100.0 | 97.1 | 90.9 | 81.6 | 77.3 | 74.5 | 70.5 |
| Example 2 | 100.0 | 97.2 | 90.8 | 82.2 | 77.4 | 73.9 | 69.2 |
| Example 3 | 100.0 | 97.6 | 91.7 | 81.8 | 77.3 | 74.3 | 70.2 |
| Comp. Example 1 | 100.0 | 96.9 | 90.0 | 81.3 | 76.0 | 72.4 | 67.6 |
| Comp. Example 2 | 100.0 | 96.6 | 89.2 | 81.3 | 75.5 | 71.5 | 66.5 |
| Comp. Example 3 | 100.0 | 96.8 | 89.6 | 81.7 | 76.3 | 72.9 | 68.3 |
| Comp. Example 4 | 100.0 | 96.7 | 89.4 | 82.1 | 76.4 | 71.9 | 66.6 |

It can be confirmed from Table 2 that the pouch-type secondary batteries manufactured according to Examples 1 to 3 of the present invention included a second graphite-based active material (second layer) having a high content of artificial graphite, and thus exhibited excellent charging capacity characteristics in the 1.5 to 2.0 C-rate section compared to pouch-type secondary batteries manufactured according to Comparative Examples.

It could be confirmed that in Example 1, the total weight ratio of artificial graphite:natural graphite in the first graphite-based active material (first layer) and the second graphite-based active material (second layer) was the same as the total weight ratio of artificial graphite:natural graphite of Comparative Example 4, but the content of artificial graphite in the second graphite-based active material (second layer) was high, so high-rate charging capacity due to reduction in resistance was improved, thereby ensuring excellent charging and output characteristics.

TABLE 3

| | Artificial graphite: natural graphite (by weight) | | | Discharge capacity retention rate for each fast charging cycle (%) | | |
|---|---|---|---|---|---|---|
| | First layer | Second layer | First layer + Second layer | After 100 cycles | After 200 cycles | After 300 cycles |
| Example 1 | 5:5 | 9:1 | 7:3 | 97.80 | 96.5 | 95.0 |
| Example 2 | 1:9 | 8:2 | 4.5:5.5 | 97.46 | 95.8 | 84.6 |
| Example 3 | 1:9 | 9:1 | 5:5 | 97.51 | 96.1 | 79.5 |
| Comp. Example 1 | 9:1 | 5:5 | 7:3 | 88.60 | 62.7 | — |
| Comp. Example 2 | 8:2 | 2:8 | 5:5 | 87.36 | 58.6 | — |
| Comp. Example 3 | 7:3 | 3:7 | 5:5 | 88.1 | 61.4 | — |

It can be confirmed from Table 3 that lithium secondary batteries manufactured according to Examples 1 to 3 had less reduction in capacity retention rate (%) over time than lithium secondary batteries manufactured according to Comparative Examples, thereby ensuring excellent charging, lifespan, and output characteristics.

It could be confirmed that in Comparative Example 1, since the first layer configuration and the second layer configuration of the present invention were manufactured so as to be opposite to each other, the capacity retention rate (%) after 200 cycles and 300 cycles was significantly lower than that of Example 1, thereby exhibiting an intended effect of the present invention.

Meanwhile, it can be confirmed that in Example 1, which corresponds to the preferred range (excess amount of artificial graphite) of the present invention in the total content of the first graphite-based active material (first layer) and the second graphite-based active material (second layer), the lifespan characteristics after 300 cycles were further improved compared to Examples 2 and 3 that do not fall within the preferred scope of the present invention.

Evaluation Example 3

Evaluation of Battery Characteristics Depending on Thickness Change of Negative Electrode Active Material Layer Examples 4 to 7

A negative electrode and a coin cell were manufactured in the same manner as those in Example 1, except that the thicknesses of the first negative electrode active material layer and the second negative electrode active material layer were prepared as shown in Table 4 below.

(Evaluation Method)

*Evaluation of Interface Adhesive Force Between Negative Electrode Active Material Layer and Current Collector The evaluation of negative electrodes manufactured in Examples 1 and 4 to 7 was performed in the same manner as that in the evaluation of the interfacial adhesive force of Evaluation Example 1, and the evaluation results are summarized in Table 4 below.

*Evaluation of Electrode Volume Expansion Rate During Negative Electrode Charging The negative electrodes and coin cells manufactured in Examples 1 and 4 to 7 were charged with a constant current of 0.1 C rate at room temperature (25° C.) until a voltage reached 0.01V (vs. Li), and charging was then cut off at a current of 0.01 C rate while maintaining 0.01V in a constant voltage mode, thereby charging the negative electrodes and coin cells at a constant voltage. Discharging was performed at a constant current of 0.1 C rate until a voltage reached 1.5V (vs. Li). The charging and the discharging were set as 1 cycle, 1 cycle charging was further performed in the same manner, and the coin cell was then disassembled.

The thickness of the uncharged negative electrode (SOC0) and the thickness of the charged negative electrode (SOC100) were measured, and comparison results are summarized in Table 4 below.

*Evaluation of Electrode Detachment During Negative Electrode Charging

The negative electrodes and coin cells manufactured in Examples 1 and 4 to 7 were charged with a constant current of 0.1 C rate at room temperature (25° C.) until a voltage reached 0.01 V (vs. Li), and charging was then cut off at a current of 0.01 C rate while maintaining 0.01V in a constant voltage mode, thereby charging the negative electrodes and coin cells at a constant voltage. Discharging was performed at a constant current of 0.1 C rate until a voltage reached 1.5V (vs. Li). The charging and the discharging were set as 1 cycle, 1 cycle charging was further performed in the same manner, and the coin cell was then disassembled.

The charged negative electrode was left at room temperature (25° C.) for 10 minutes without a separate washing process, and the state of the adhesive surface between the substrate surface and the active material layer was visually confirmed, and the results are summarized in Table 4 below.

TABLE 4

|  | Negative electrode active material layer thickness (%) (First layer: Second layer) | Electrode adhesive force (N) | Volume expansion rate (SOC100-SOC0)/SOC0 (%) | Fully charged electrode detachment |
|---|---|---|---|---|
| Example 1 | 50:50 (NG:AG = 30:70) | 0.55 | 16.5 | — |
| Example 4 | 10:90 (NG:AG = 14:86) | 0.43 | 15.2 | Detachment |
| Example 5 | 30:70 (NG:AG = 22:78) | 0.49 | 15.7 | Detachment |
| Example 6 | 70:30 (NG:AG = 38:62) | 0.56 | 17.1 | — |

TABLE 4-continued

|  | Negative electrode active material layer thickness (%) (First layer: Second layer) | Electrode adhesive force (N) | Volume expansion rate (SOC100-SOC0)/SOC0 (%) | Fully charged electrode detachment |
|---|---|---|---|---|
| Example 7 | 90:10 (NG:AG = 46:54) | 0.61 | 17.8 | — |

(In Table 4, "NG:AG" is a weight ratio of total of natural graphite:artificial graphite in the first layer and the second layer.)

Referring to Table 4, in the case of Example 1 in which the first layer and the second layer were formed at a preferable thickness ratio of the present invention, the volume expansion rate of the charging electrode was low, and the fully charged electrode detachment did not occur. On the other hand, in Examples 4 and 5, the fully charged electrode detachment occurred, and in Examples 6 and 7, electrode adhesive force was excellent and electrode detachment did not occur, but the volume expansion rate of the charged electrode was excessively high, and thus the energy density was reduced, which was not appropriate.

Evaluation Example 4

Evaluation of Battery Characteristics Depending on Composition and Thickness Changes of Third Negative Electrode Active Material Layer Examples 8 to 13

A negative electrode, a coin cell, and a secondary battery were manufactured in the same manner as those in Example 1, except that a type of third graphite-based active material (artificial or natural graphite) in a third negative active layer and a thickness of the third negative active layer were as shown in Table 5 below.

(Evaluation Method)

*Evaluation of Electrode Volume Expansion Rate During Negative Electrode Charging The evaluation of negative electrodes manufactured in Examples 1 and 8 to 13 was performed in the same manner as that in the evaluation of the volume expansion rate of charging electrode of Evaluation Example 3, and the evaluation results are summarized in Table 5 below.

*Evaluation of Cell Energy Density

After manufacturing a pouch-type secondary battery (cell) having a large capacity of 20 Ah or more using the negative electrodes and the same positive electrodes manufactured in Example 1 and 8 to 13, the pouch-type secondary battery (cell) was charged with a constant current of 0.3 C rate until a voltage reached 4.2V, and charging was then cut off at a current of 0.05 C rate while maintaining 4.2V in a constant voltage mode, thereby charging the pouch-type secondary battery (cell) at a constant voltage. Subsequently, discharging was performed at a constant current of 0.3 C rate until a voltage reached 2.5V to measure discharge capacity (Ah) and energy (Wh), and the volume of each battery in a charged state of 4.2V to calculate a volume-energy density. The results are summarized in Table 5 below.

*Evaluation of Fast Charging Lifespan Characteristics

The evaluation of secondary batteries manufactured in Examples 1 and 8 to 13 was performed in the same manner as that in the evaluation of the fast charging lifespan characteristics of Evaluation Example 2, and the evaluation results are summarized in Table 5 below.

TABLE 5

| | Third negative electrode active material layer | | Volume expansion rate (SOC100-SOC0)/ SOC0 (%) | Energy density (Wh/L) | Discharge capacity retention rate for each fast charging cycle (%) After 100 cycles |
|---|---|---|---|---|---|
| | Third graphite-based active material type | Thickness (%) | | | |
| Example 1 | Artificial graphite | 5 | 16.5 | 704 | 97.80 |
| Example 8 | Artificial graphite | 1 | 17.4 | 702 | 97.49 |
| Example 9 | Artificial graphite | 10 | 16.0 | 705 | 98.24 |
| Example 10 | Artificial graphite | 20 | 15.4 | 699 | 96.35 |
| Example 11 | Artificial graphite | 0.3 | 18.9 | 696 | 92.78 |
| Example 12 | Natural graphite | 5 | 18.5 | 698 | 94.64 |
| Example 13 | No third layer was formed | | 22.6 | 687 | 89.40 |

(The thickness (%) of the third negative electrode active material layer is a thickness (%) based on the total thickness of the negative electrode active material layer.)

It could be confirmed from Table 5 that in the case of Examples in which the third layer was formed, with the introduction of the third layer, side reactions of the electrolyte were reduced and the effect of suppressing the expansion rate of the electrode was exhibited, thereby enabling high energy density to be implemented. Specifically, the third layer, unlike the first and second layers, did not contain a silicon-based active material, such that irreversible decomposition of the electrolyte by the silicon-based material may be prevented, thereby implementing an effect of suppressing excessive expansion of the silicon-based negative active material layer due to electrode charging. Through the above-mentioned effects, it was possible to improve the chemical and mechanical safety of the negative electrode, thereby improving the long-term lifespan of the lithium secondary battery and increasing the energy density due to the compensation of an expansion thickness of the negative electrode during charging.

In addition, it could be confirmed that Examples not formed with a preferred third layer thickness compared to Examples 1, 8 and 9 formed with a preferred third layer thickness of the present invention were disadvantageous in terms of energy density (Example 10), or had insufficient suppression of side reactions of the electrolyte, resulting in an increase in the electrode expansion rate (Example 11).

Meanwhile, it was found that in the case of using natural graphite as the third negative electrode active material, the pressing of natural graphite particles having a slightly low hardness occurred during electrode rolling, making it difficult to impregnate the electrolyte into the electrode, such that the ion migration path could not be secured, and thus the lifespan characteristics of the battery may be reduced.

Evaluation Example 5

Evaluation of Battery Characteristics for Each Content of Silicon-Based Active Material Examples 14 to 17

A negative electrode, a coin cell, and a secondary battery were manufactured in the same manner as those in Example 1, except that the contents of the first and second silicon-based active materials in the first and second negative active material layers were the same as in Table 6 below.

(Evaluation Method)

*Evaluation of Electrode Volume Expansion Rate During Negative Electrode Charging The evaluation of negative electrodes manufactured in Examples 1 and 14 to 17 was performed in the same manner as that in the evaluation of the volume expansion rate of the charging electrode of Evaluation Example 3, and the evaluation results are summarized in Table 6 below.

*Evaluation of Cell Energy Density

The evaluation of secondary batteries manufactured in Examples 1 and 14 to 17 was performed in the same manner as that in the evaluation of the cell energy density of Evaluation Example 4, and the evaluation results are summarized in Table 6 below.

*Evaluation of Fast Charging Lifespan Characteristics

The evaluation of negative electrodes manufactured in Examples 1 and 14 to 17 was performed in the same manner as that in the evaluation of the volume expansion rate of the charging electrode of Evaluation Example 3, and the evaluation results are summarized in Table 6 below.

*Evaluation of Cell Energy Density

The evaluation of secondary batteries manufactured in Examples 1 and 14 to 17 was performed in the same manner as that in the evaluation of the cell energy density of Evaluation Example 4, and the evaluation results are summarized in Table 6 below.

*Evaluation of Fast Charging Lifespan Characteristics

The evaluation of secondary batteries manufactured in Examples 1 and 14 to 17 was performed in the same manner as that in the evaluation of the fast charging lifespan characteristics of Evaluation Example 2, and the evaluation results are summarized in Table 6 below.

*Evaluation of (General) Charging Lifespan Characteristics

The secondary batteries manufactured in Examples 1 and 14 to 17 were evaluated for general charging lifespan characteristics in the range of DOD94 (SOC2-96) in a chamber maintained at 35° C. The secondary battery was charged at 0.3 C up to a voltage corresponding to SOC96 under constant current/constant voltage (CC/CV) conditions, charging was cut off at 0.05 C. Then, secondary battery was discharged at 0.3 C up to a voltage corresponding to SOC2 under a constant current (CC) condition, and the discharging capacity was measured. After repeating the above process at 500 cycles, the discharging capacity retention rate of the evaluation of the (general) charging lifespan characteristics was measured, and the measurement results are summarized in Table 6 below.

TABLE 6

|  | First negative electrode active material layer First silicon-based active material content | Second negative electrode active material layer Second silicon-based active material content | Volume expansion rate (SOC100 − SOC0)/ SOC0 (%) | Energy density (Wh/L) | Discharge capacity retention rate for each fast charging cycle (%) After 100 cycles | Discharge capacity retention rate for each general charging cycle (%) After 500 cycles |
|---|---|---|---|---|---|---|
| Example 1 | 6.0 | 6.0 | 16.5 | 704 | 97.80 | 92.2 |
| Example 14 | 9.0 | 9.0 | 18.9 | 716 | 96.62 | 91.5 |
| Example 15 | 13.0 | 13.0 | 25.3 | 722 | 95.47 | 90.9 |
| Example 16 | 20.0 | 20.0 | 34.7 | 735 | 85.54 | 85.9 |
| Example 17 | 25.0 | 25.0 | 44.1 | 736 | 81.33 | 82.7 |

(The contents of the first and second silicon-based active materials are each weight % based on the total weight of the active materials of the first and second negative electrode active material layers)

Referring to Table 6, all of the secondary batteries of Examples 1 and 14 to 17 had excellent (general) charging 500-cycle lifespan characteristics, but when the content of the silicon-based active material was increased to 20 wt % or more, fast charging 100-cycle lifespan characteristics tended to be reduced to equal to or greater than 80% and less than 90%. Thus, referring to Table 3, in the case of the secondary battery of Example 1, considering that the 300 cycle lifespan is maintained at a very high level under the same fast lifespan characteristics evaluation conditions, whether or not the battery for fast charging maintains a capacity retention rate of 90% or more in fast charging 100-cycle may be determined as an indicator of commercialization.

Meanwhile, if the content of the silicon-based active material is less than 6% by weight, even if the volume expansion rate of the battery is reduced, the energy density is excessively low, less than 700 Wh/L, which was not suitable.

In summary, it could be confirmed that the present invention may contain the silicon-based active material in a higher content than the related art by making blending ratios between natural graphite and artificial graphite in each layer in the multilayer negative electrode active material layer including a silicon-based material different from each other to improve the adhesive force to the negative electrode current collector and reduce the interface resistance, and accordingly achieve a high energy density (700 Wh/L or more) and improve performance such as the negative electrode detachment, general lifespan characteristics, and fast lifespan characteristics. Preferably, even if the silicon-based active material is contained in a high content of 6 to 30% by weight, preferably 6 to 20% by weight, and more preferably 9 to 20% by weight, based on the total weight of the active material of the first and second layers, it is preferable because fast charging 100-cycle lifespan characteristics may be achieved 90% or more, and fast charging 300-cycle lifespan characteristics may be achieved 80% or more.

Deterioration of the battery due to volume expansion of the silicon-based material and side reactions of the electrolyte may be suppressed and high-rate charging characteristics through reduction in resistance may be improved, by preparing a multilayer negative electrode active material layer in which the blending ratio of natural graphite and artificial graphite is applied differently in a thickness direction in the electrode.

The first negative electrode active material layer is a coating layer for the purpose of improving adhesive force between the silicon-based material and the negative electrode current collector, and may improve adhesive force by increasing the ratio of the natural graphite-based material and minimizing the ratio of the artificial graphite-based material in the graphite-based material.

The second negative electrode active material layer is a coating layer for improving high-rate charging characteristics of the coating layer including the silicon-based material, and may improve high-rate charging characteristics by increasing the ratio of the artificial graphite-based material and minimizing the ratio of the natural graphite-based material in the graphite-based material.

The active material of the third negative electrode active material layer consists only of graphite-based materials, and may reduce resistance at an electrode interface and minimize side reactions between the electrolyte and the silicon-based material.

Although the examples of the present invention have been described above, the present invention is not limited to the above examples and may be manufactured in various different forms, and those skilled in the art to which the present invention pertains will appreciate that various modifications and alterations may be made without changing the technical idea or essential features of the present invention. Therefore, it is to be understood that examples described hereinabove are illustrative rather than being restrictive in all aspects.

What is claimed is:

1. A negative electrode for a lithium secondary battery, comprising:
    a current collector;
    a first negative electrode active material layer disposed on the current collector and including a first graphite-based active material containing artificial graphite and natural graphite, and a first silicon-based active material; and
    a second negative electrode active material layer disposed on the first negative electrode active material layer and including a second graphite-based active material containing artificial graphite and natural graphite, and a second silicon-based active material,
    wherein the first graphite-based active material has a content of the artificial graphite equal to or less than that of the natural graphite, and the second graphite-based active material has a content of the artificial graphite greater than that of the natural graphite,
    wherein the second graphite-based active material contains the artificial graphite and the natural graphite in a weight ratio of 80:20 to 60:40, wherein a thickness ratio between the first negative electrode active material layer and the second negative electrode active material layer is greater than 3:7 and equal to or less than 5:5, and further comprising a third negative electrode active material layer disposed on the second negative electrode active material layer and including a third graphite-based active material containing artificial graphite, wherein the third graphite-based active material is a granular-type artificial graphite.

2. The negative electrode for a lithium secondary battery of claim 1, wherein the first graphite-based active material contains the artificial graphite and the natural graphite in a weight ratio of 5:95 to 50:50.

3. The negative electrode for a lithium secondary battery of claim 1, wherein the first negative electrode active material layer includes 0.1 to 35% by weight of the first silicon-based active material, based on the total weight of the active material, and the second negative electrode active material layer includes 0.1 to 35% by weight of the second silicon-based active material, based on the total weight of the active material.

4. The negative electrode for a lithium secondary battery of claim 3, wherein the first negative electrode active material layer includes 6 to 30% by weight of the first silicon-based active material, based on the total weight of the active material, and the second negative electrode active material layer includes 6 to 30% by weight of the second silicon-based active material, based on the total weight of the active material.

5. The negative electrode for a lithium secondary battery of claim 1, wherein the third graphite-based active material has a particle size of 13 to 20 μm.

6. The negative electrode for a lithium secondary battery of claim 1, wherein the third negative electrode active material layer has a density of 1.55 to 1.8 g/cm$^3$.

7. The negative electrode for a lithium secondary battery of claim 1, wherein a thickness of the third negative electrode active material layer is 0.5 to 15% based on the total thickness of the negative electrode active material layers.

8. The negative electrode for a lithium secondary battery of claim 1, wherein the first negative electrode active material layer and the second negative electrode active material layer have a continuous concentration gradient of the active material at an interface therebetween.

9. A lithium secondary battery comprising the negative electrode of claim 1; a positive electrode; a separator; and an electrolyte.

* * * * *